United States Patent
Jung et al.

(10) Patent No.: US 8,375,110 B2
(45) Date of Patent: Feb. 12, 2013

(54) APPARATUS TO MANAGE BINDING INFORMATION ON BUNDLES REMOTELY INSTALLED INTO AN OSGI SERVICE PLATFORM AND METHOD THEREOF

(75) Inventors: Dong-shin Jung, Suwon-si (KR); Siddapur Channakeshava Sreekanth, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 760 days.

(21) Appl. No.: 12/436,232

(22) Filed: May 6, 2009

(65) Prior Publication Data

US 2009/0282400 A1 Nov. 12, 2009

Related U.S. Application Data

(60) Provisional application No. 61/051,139, filed on May 7, 2008.

(30) Foreign Application Priority Data

Aug. 19, 2008 (KR) .................... 10-2008-0081071

(51) Int. Cl.
*G06F 15/177* (2006.01)
*G06F 15/16* (2006.01)
(52) U.S. Cl. ......... 709/221; 709/217; 709/220; 709/222
(58) Field of Classification Search .................. 709/217, 709/220–222
See application file for complete search history.

(56) References Cited

U.S. PATENT DOCUMENTS

| | | | |
|---|---|---|---|
| 7,117,195 B2 * | 10/2006 | Chantrain et al. | 709/221 |
| 7,289,795 B2 * | 10/2007 | Ma et al. | 455/414.1 |
| 7,398,305 B2 * | 7/2008 | Bodin et al. | 709/222 |
| 8,127,237 B2 * | 2/2012 | Beringer | 715/762 |
| 2005/0114491 A1 | 5/2005 | Bushmitch et al. | |
| 2005/0154785 A1 * | 7/2005 | Reed et al. | 709/217 |
| 2005/0195390 A1 * | 9/2005 | Jeon et al. | 356/237.2 |
| 2006/0293033 A1 | 12/2006 | Ma et al. | |
| 2007/0112909 A1 | 5/2007 | Miyamoto et al. | |
| 2007/0192462 A1 | 8/2007 | Bae et al. | |
| 2008/0256225 A1 * | 10/2008 | Suh et al. | 709/223 |

FOREIGN PATENT DOCUMENTS

| | | |
|---|---|---|
| KR | 10-0703361 | 3/2007 |
| KR | 10-2007-0051744 | 5/2007 |
| WO | WO 2007/004754 A1 | 1/2007 |
| WO | WO 2007/066843 | 6/2007 |
| WO | WO 2007/104501 | 9/2007 |

OTHER PUBLICATIONS

International Search Report issued on Jan. 11, 2012, in corresponding PCT International Application No. PCT/KR2009/002394 (9 pages).
Roach Dynamicsoft A B: "Session Initiation Protocol (SIP)—Specific Event Notification; rfc3265.txt", Jun. 1, 2002 (39 pages).

(Continued)

*Primary Examiner* — Minh-Chau Nguyen
(74) *Attorney, Agent, or Firm* — NSIP Law

(57) ABSTRACT

An apparatus to generate and manage binding information that is used to map a bundle remotely installed into an open service gateway initiative (OSGi) framework, to at least one controller device that is interested in a change of a life cycle of the bundle, by using a controlled device, in which an OSGi service platform is installed.

17 Claims, 11 Drawing Sheets

OTHER PUBLICATIONS

"OSGi Service Platform Core Specification." The Open Services Gateway Initiative: Release 4, version 4.1, Apr. 2007, (278 pages).

Kang, Dong-oh, et al., "UPnP AV architectural multimedia system with an OSGi Platform." Consumer Electronics, 2004 IEEE International Symposium on Reading, UK. Sep. 1-3, 2004, Piscataway, NJ, USA, IEEE, pp. 442-446 (5 pages).

Chinese Office Action issued Oct. 29, 2012 in counterpart Chinese Application No. 20980126291.6 (8 pages, including English language translation).

* cited by examiner

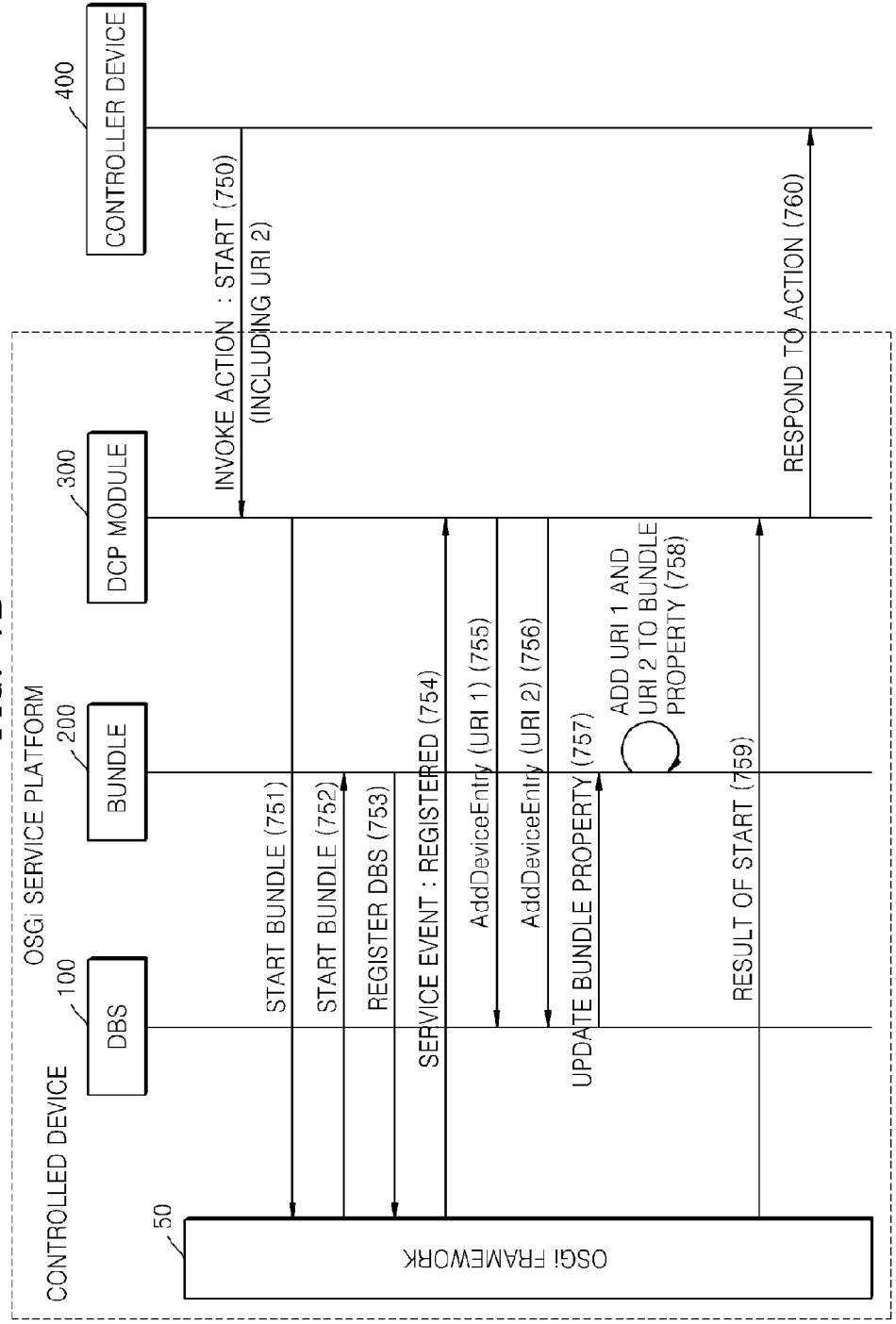

APPARATUS TO MANAGE BINDING INFORMATION ON BUNDLES REMOTELY INSTALLED INTO AN OSGI SERVICE PLATFORM AND METHOD THEREOF

CROSS-REFERENCE TO RELATED APPLICATIONS

This application claims the benefit of U.S. Provisional Application No. 61/051,139, filed on May 7, 2008, and Korean Patent Application No. 10-2008-0081071, filed on Aug. 19, 2008, in the Korean Intellectual Property Office, the disclosures of which are incorporated herein in their entirety by reference.

BACKGROUND

1. Field

The following description relates to an open service gateway initiative (OSGi), and more particularly, to a method of managing a bundle that is remotely installed by a controller device, by using an OSGi-based controlled device.

2. Description of the Related Art

With the development of various communication devices, a first communication device may perform a function by cooperating with a plurality of other communication devices via a network so that the original functionality of the first communication device can be extended. Open service gateway initiative (OSGi) may be used to provide such an execution environment.

OSGi is a standard related to technology for dynamically installing new services into a network device and for executing the services. Controller devices that belong to a network may remotely install bundles in a controlled device, in which an OSGi service platform is installed, and may use services provided by the bundles.

Bundles are basic units which perform distribution and management in a network, include at least one OSGi service, and are managed by an OSGi framework. In other words, the OSGi framework provides a standardized execution environment for various applications (bundles). The general concept of OSGi is well known to one of ordinary skill in the art, and is described in various OSGi release documents. However, current OSGi technology does not provide a mechanism to map bundles that are remotely installed into an OSGi service platform to controller devices in which bundles are installed, and to manage the bundles and the controller device.

SUMMARY

One general aspect includes an apparatus to manage a bundle that is remotely installed via a network, by using an open service gateway initiative (OSGi)-based controlled device, and a method thereof.

According to another general aspect, there is provided a method of managing a bundle that is remotely installed by a controller device, the method executed by an open service gateway initiative (OSGi)-based controlled device, the method including, in response to a service event indicating that a predetermined service that is provided by the bundle is registered in an OSGi service registry occurring, generating binding information that is used to map the bundle to the controller device, by using the service, and notifying an event on a change of a life cycle of the bundle to the controller device by using the generated binding information.

The generating of the binding information may include adding an identifier of the controller device to a bundle property of the bundle by using the service.

The method may further include, in response to uninstallation of the bundle being requested by the controller device, storing the identifier in a region which is not deleted even though the bundle is uninstalled, wherein the notifying of the event comprises, in response to a bundle event indicating that the bundle has been uninstalled occurring, notifying the bundle event to the controller device by referring to the stored identifier.

The method may further include, in response to an event unsubscription request on the bundle being received from the controller device, deleting the identifier from the bundle property by using the service.

The method may further include in response to detecting that the controller device is disconnected from the network, retrieving bundles comprising the identifier in the bundle property, among bundles of the OSGi framework, and deleting the identifier from bundle properties of the retrieved bundles by using predetermined services that are provided by the retrieved bundles.

The generating of the binding information may include, in response to an identifier of other controller devices being included in an action invocation message or an event subscription request message received from the controller device, together with the identifier of the controller device, adding the identifiers to the bundle property by using the service.

The identifier may be a universal resource identifier (URI) of the controller device.

According to yet another general aspect, there is provided an apparatus to manage a bundle that is remotely installed by a controller device, wherein the apparatus is an open service gateway initiative (OSGi)-based controlled device, including a binding information management unit generating binding information that is used to map the bundle to the controller device, by using a predetermined service in response to a service event indicating that the service that is provided by the bundle is registered in an OSGi service registry occurring, and an event notification unit notifying an event on a change of a life cycle of the bundle to the controller device by using the generated binding information.

The binding information management unit may add an identifier of the controller device to a bundle property of the bundle by using the service.

The apparatus may further include a binding information backup unit to store the identifier in a region which is not deleted even though the bundle is uninstalled in response to uninstallation of the bundle being requested by the controller device, wherein the event notification unit notifies the bundle event to the controller device by referring to the stored identifier in response to a bundle event indicating that the bundle has been uninstalled occurring.

The binding information management unit may delete the identifier from the bundle property by using the service in response to an event unsubscription request on the bundle being received from the controller device.

The apparatus may further include a retrieval unit to retrieve the bundle including the identifier in the bundle property, among bundles of the OSGi framework, in response to detecting that the controller device is disconnected from the network, wherein the binding information management unit deletes the identifier from bundle properties of the retrieved bundles by using predetermined services that are provided by the retrieved bundles.

The binding information management unit may the identifiers to the bundle property by using the service in response to an identifier of other controller devices being included in an action invocation message or an event subscription request message received from the controller device, together with the identifier of the controller device.

The identifier may be a universal resource identifier (URI) of the controller device.

According to still another general aspect, there is provided a computer readable recording medium having recorded thereon a program to perform a bundle management method executed by an open service gateway initiative (OSGi)-based controlled device, including instructions to cause a computer to in response to a service event indicating that a predetermined service that is provided by the bundle is registered in an OSGi service registry occurring, generate binding information that is used to map the bundle to the controller device, by using the service, and notify an event on a change of a life cycle of the bundle to the controller device by using the generated binding information.

Other features and aspects will be apparent from the following detailed description, the drawings, and the claims.

BRIEF DESCRIPTION OF THE DRAWINGS

FIGS. 7A and 7B are flowcharts illustrating an example of an operation of generating binding information.

Figure 1:
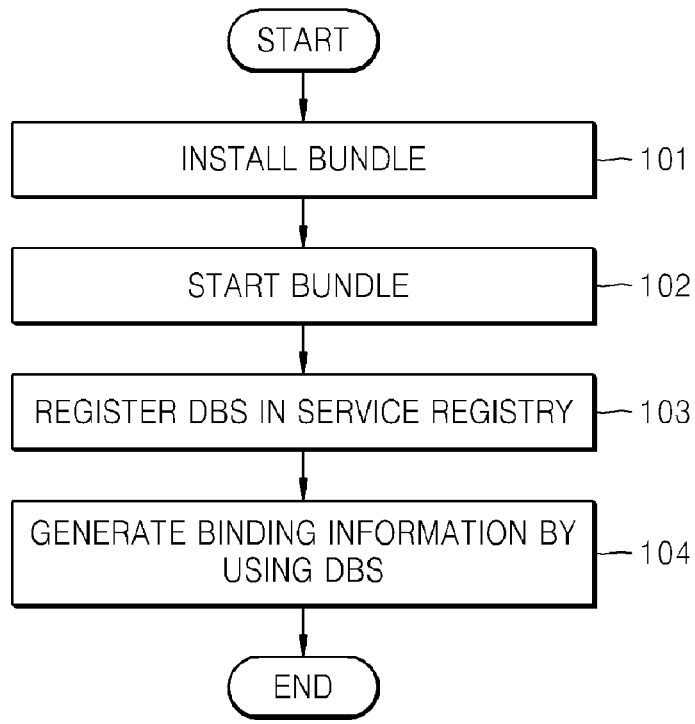
FIG. 1 is a flowchart illustrating an example of an operation of generating binding information.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a flowchart illustrating an example of an operation of generating binding information. Binding information may be defined as information that is obtained by mapping a bundle installed in an open service gateway initiative (OSGi) framework of a controlled device to a controller device that is interested in the bundle, that is, a controller device to which a bundle event on a change of a life cycle of the bundle needs to be notified.

Often, the controller device that is interested in the bundle may be a controller device in which the bundle is installed. However, other controller devices may need to be notified of a change of a state of the bundle. Thus, a plurality of controller devices may be mapped to one bundle according to a user's determination.

As illustrated in FIG. 1, the controller device installs a bundle into an OSGi framework of a controlled device, remotely via a network (101).

The bundle starts due to a request of the controller device (102).

A device binding service (DBS), among services provided by the started bundle, is registered in an OSGi service registry (103). DBS is a name of a service that is newly suggested in the current embodiment and manages binding information of the bundle installed into the OSGi framework.

In other words, according to an example embodiment, it is assumed that all bundles that are installed into a controlled device by using a controller device include a DBS for managing binding information of a bundle. Thus, when the bundle remotely installed into the controlled device starts, the DBS of the bundle is registered in the OSGi service registry. For the convenience of explanation and without limiting thereto, hereinafter, all bundles may be referred to as remotely-installed bundles.

Referring again to FIG. 1, binding information is generated by using the DBS (104). In other words, the DBS that is registered in the OSGi service registry of the controlled device provides an application programming interface (API) to generate binding information. The generation of the binding information may include adding an identifier of the controller device that has installed the bundle in a bundle property by using the API of the DBS.

The bundle property is a file that stores various information pertaining to the bundle. Where an identifier of the controller device is included in the bundle property, the controller device that has installed the bundle may be identified. As such, the identifier of the controller device included in the bundle property of a specific bundle may be binding information that is obtained by mapping the bundle to the controller device corresponding to the identifier.

Hereinafter, it is assumed that the identifier of the controller device included in the bundle property is binding information. However, the binding information may be in various formats in which the bundle and the controller device are mapped to each other. Also, binding information may be stored in regions other than the bundle property.

Referring to FIG. 1, it is assumed that the binding information is generated when the bundle starts. However, the binding information may be generated in other operations according to implementation examples. For example, where a control protocol between the controller device and the controlled device is universal plug and play (UPnP), in response to the controlled device receiving a UPnP control message or a UPnP event subscription request message that requests a specific action, the binding information may be generated.

Where an identifier of another controller device is included in an action invocation message or an event subscription request message, the controlled device generates binding information that is obtained by mapping two controller devices to one bundle. For example, two identifiers may be added to a bundle property of a bundle. A number of controller devices that are mapped to one bundle may be two or more.

An identifier of a controller device may be a universal resource identifier (URI) of the controller device.

Figure 2:
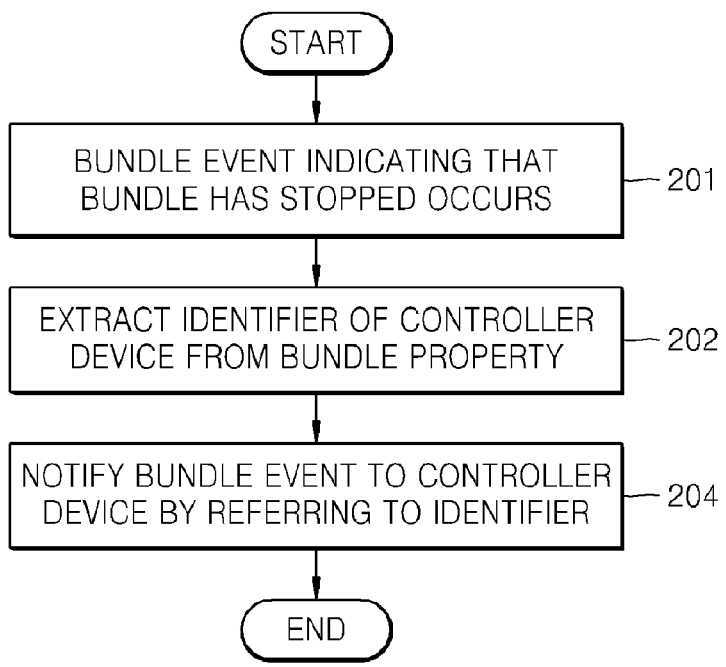
FIG. 2 is a flowchart illustrating an example of an operation of a controlled device when a bundle stops.

FIG. 2 is a flowchart illustrating an example of an operation of a controlled device when a bundle stops.

A bundle event that indicates the bundle stops occurs (201). An OSGi framework notifies a bundle event to an event listener whenever a life cycle of the bundle changes.

The controlled device extracts an identifier of the controller device that has installed the bundle remotely from a bundle property of the stopped bundle (202).

The controlled device notifies of the bundle event to the controller device by referring to the extracted identifier (203).

Accordingly, an OSGi-based controlled device manages binding information that is obtained by mapping a bundle installed into the OSGi framework to an identifier of a controller device that is interested in the bundle, thereby determining to which controller device a bundle event will be notified.

Figure 3:
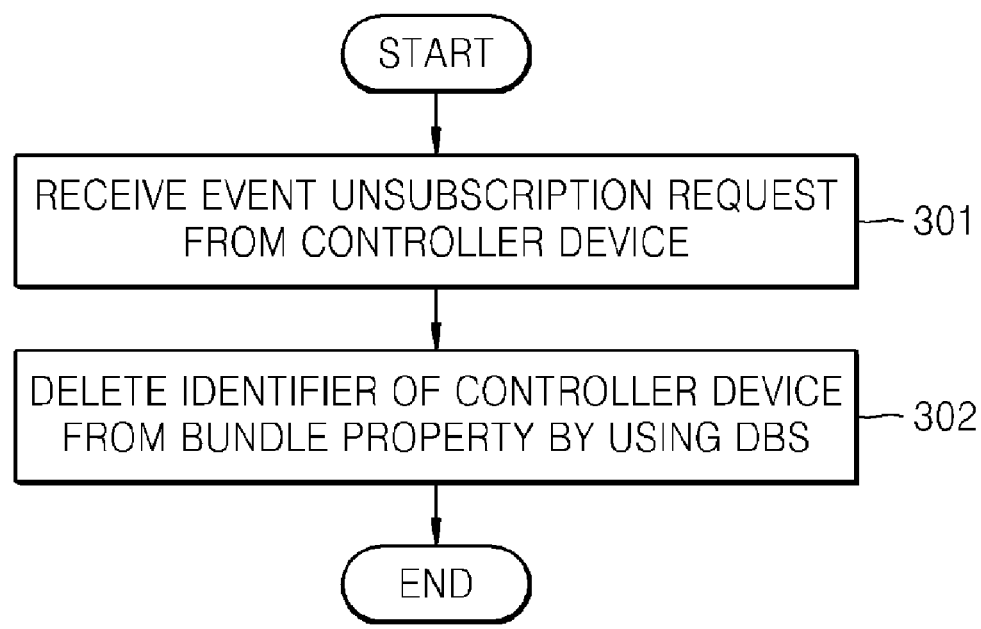
FIG. 3 is a flowchart illustrating an example of an operation of unsubscribing an event subscription.

FIG. 3 is a flowchart illustrating an example of an operation of unsubscribing an event subscription.

A controlled device receives an event unsubscription request on a specific bundle from a controller device (301).

The controlled device deletes an identifier of the controller device from a bundle registry of a bundle by using a DBS of the bundle (302).

Figure 4:
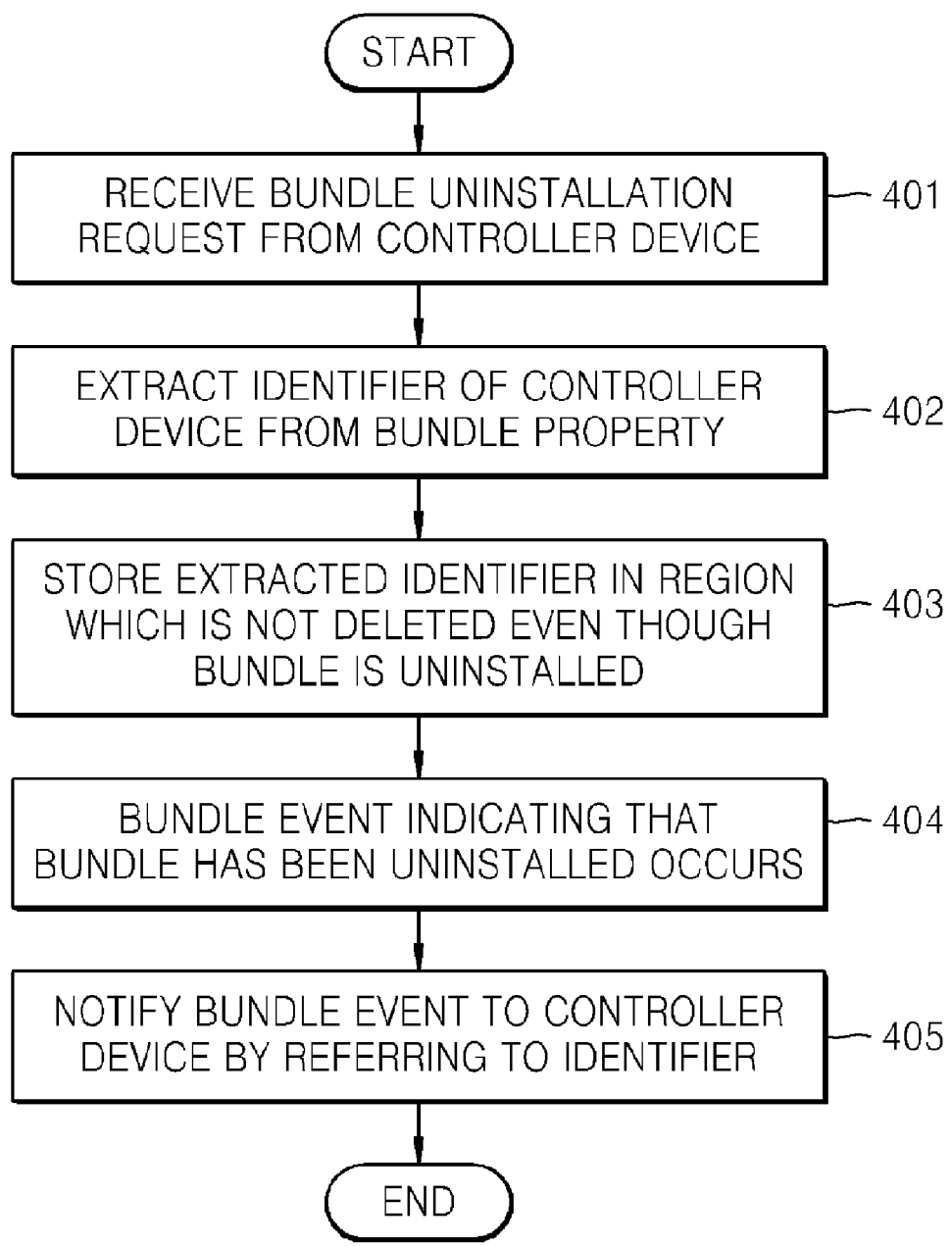
FIG. 4 is a flowchart illustrating an example of an operation of a controlled device when a bundle is uninstalled.

FIG. 4 is a flowchart illustrating an example of an operation of a controlled device when a bundle is uninstalled.

The controlled device receives a bundle uninstallation request from a controller device (401).

The controlled device extracts an identifier of the controller device from a bundle property of a bundle requested to be uninstalled (402).

The controlled device stores the extracted identifier in a region which is not deleted, even though the bundle is uninstalled (403). This procedure is performed to back up the identifier of the controller device before the bundle is uninstalled. Since the bundle property cannot be referred to after the bundle is uninstalled, the identifier of the controller device may be backed up before the bundle is uninstalled. If the identifier of the controller device is not backed up before the bundle is uninstalled, it is difficult to determine which controller device to notify.

Referring again to FIG. 4, the bundle event indicating the bundle is uninstalled occurs (404).

The controlled device notifies of the bundle event to the controller device by referring to the identifier of the stored controller device (405).

Figure 5:
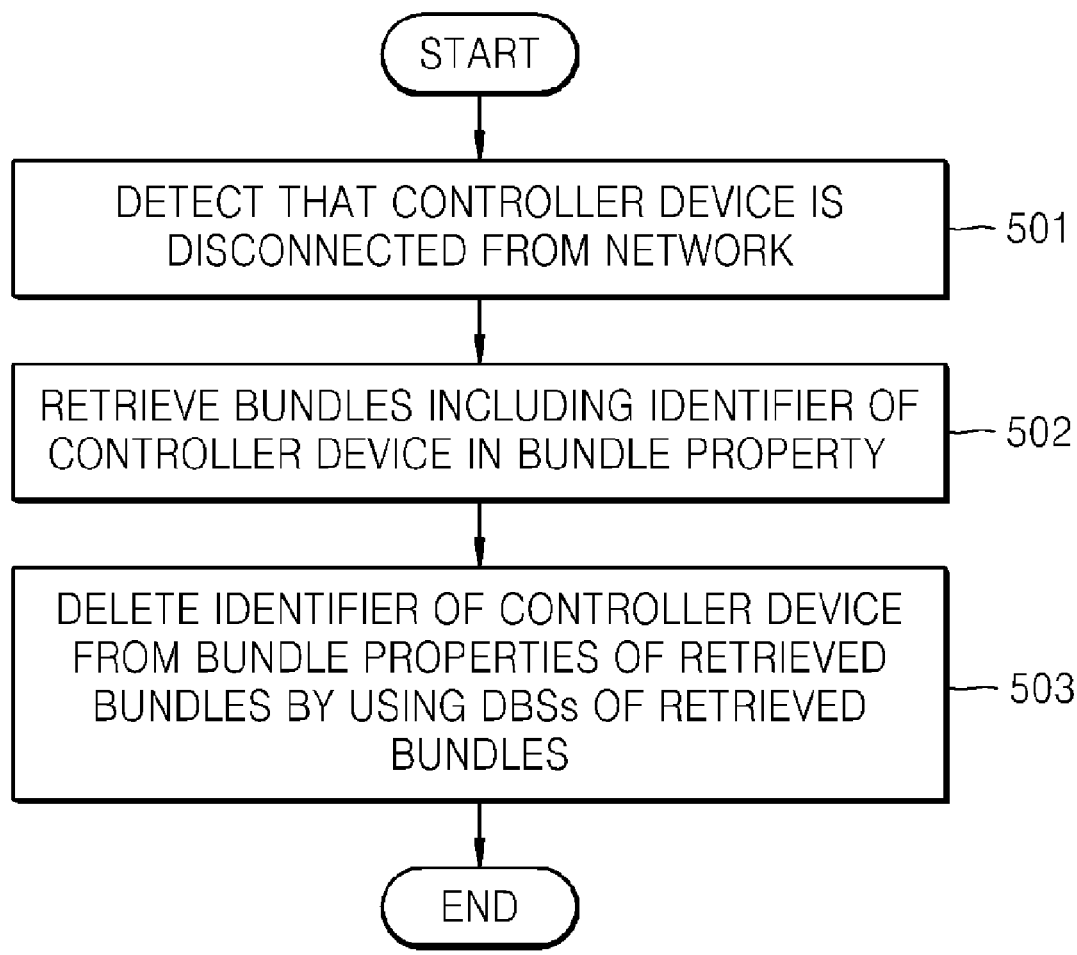
FIG. 5 is a flowchart illustrating an example of an operation of a controlled device when a controller device is disconnected from a network.

FIG. 5 is a flowchart illustrating an example of an operation of a controlled device when a controller device is disconnected from a network.

While FIG. 4 depicts the operations performed where the controller device leaves the network normally, FIG. 5 depicts operations where the controller device is abnormally terminated by not making an event unsubscription request.

Referring to FIG. 5, the controlled device detects that the controller device is disconnected from the network (501).

The controlled device retrieves bundles that include an identifier of the controller device in a bundle property, among bundles installed into an OSGi framework (502).

The controlled device deletes the identifier of the controller device from bundle properties of the retrieved bundles by using device binding services (DBSs) of the retrieved bundles (503).

Accordingly, in response to the controller device leaving the network, the controlled device deletes binding information related to the controller device and thus does not need to transmit an event message where an event related to a life cycle of the bundle occurs.

Figure 6:
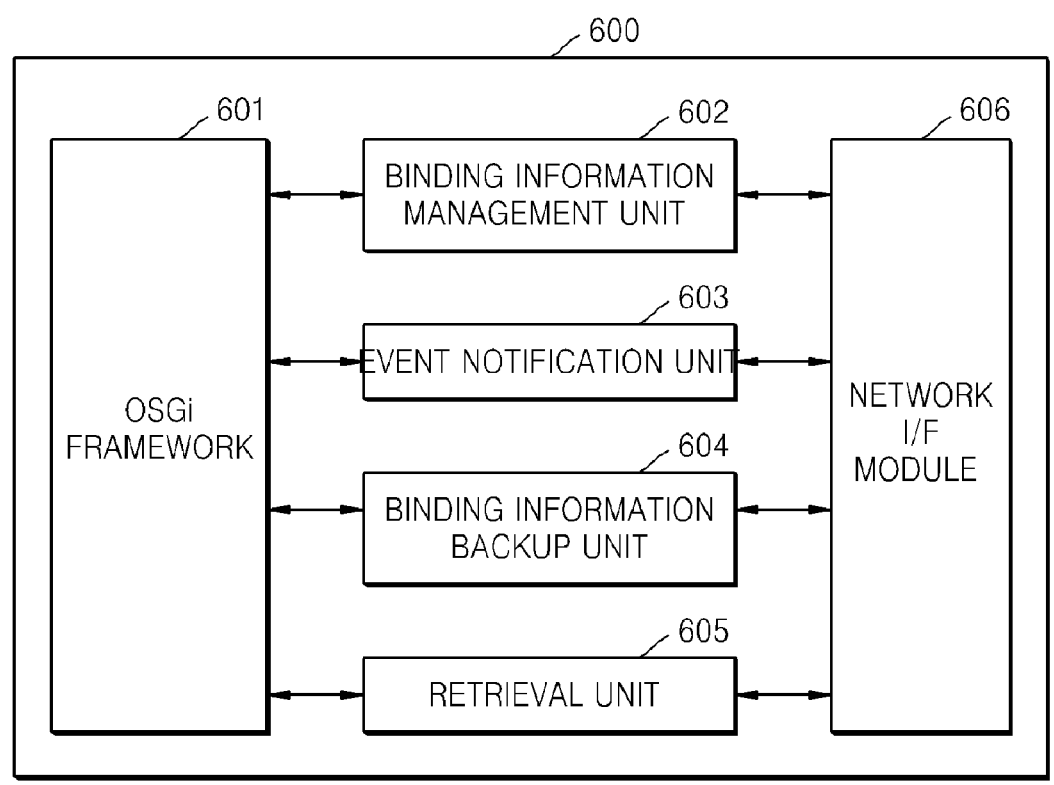
FIG. 6 illustrates an example of a structure of a controlled device.

FIG. 6 illustrates an example of a structure of a controlled device 600.

Referring to FIG. 6, the controlled device 600 includes an OSGi framework 601, a binding information management unit 602, an event notification unit 603, a binding information backup unit 604, a retrieval unit 605, and a network interface module 606.

The OSGi framework 601 is known to one of ordinary skill in the art, has been described in an OSGi standard document, and thus, a description thereof will not be repeated.

The network interface module 606 processes a control protocol between a controller device and the controlled device 600. For example, a UPnP may be used as the control protocol between the controller device and the controlled device.

The binding information management unit 602 generates binding information by using a DBS when a service event indicating that a DBS of a remotely-installed bundle has been registered in an OSGi service registry occurs.

As described above, the binding information may be generated when another action invocation message other than an action invocation message requesting start of the bundle or an event subscription request message is received from the controller device. The binding information may be implemented as an identifier included in a bundle property, and a plurality of controller devices may be mapped to one bundle.

In addition, the binding information management unit 602 deletes binding information related to the controller device by using a DBS of the bundle where the event unsubscription request on the bundle installed into the OSGi framework 601 is received from the controller device or the controller device is disconnected from the network.

The event notification unit 603 notifies a bundle event, i.e., an event related to a change of a life cycle of the bundle, to the controller device by using the binding information.

In response to the controller device requesting uninstallation of the bundle, the binding information backup unit 604 backs up the binding information in a safe place before the bundle event on uninstallation of the bundle occurs. For example, where the binding information is implemented by adding a URI of the controller device to the bundle property, if the bundle is completely uninstalled, the bundle property cannot be referred to, and thus, it cannot be determined which controller device to notify. Thus, the binding information backup unit 604 stores the URI of the controller device in a region which is not deleted even though the bundle is uninstalled before the bundle is completely uninstalled.

The retrieval unit 605 retrieves the binding information corresponding to the controller device in response to detecting that the controller device is disconnected from the network. For example, a bundle property including the URI of the controller device that leaves the network is selected from bundle properties of bundles installed into the OSGi framework 601. The binding information management unit 602 deletes the URI of the controller device, which is included in the selected bundle property.

Figure 7A:
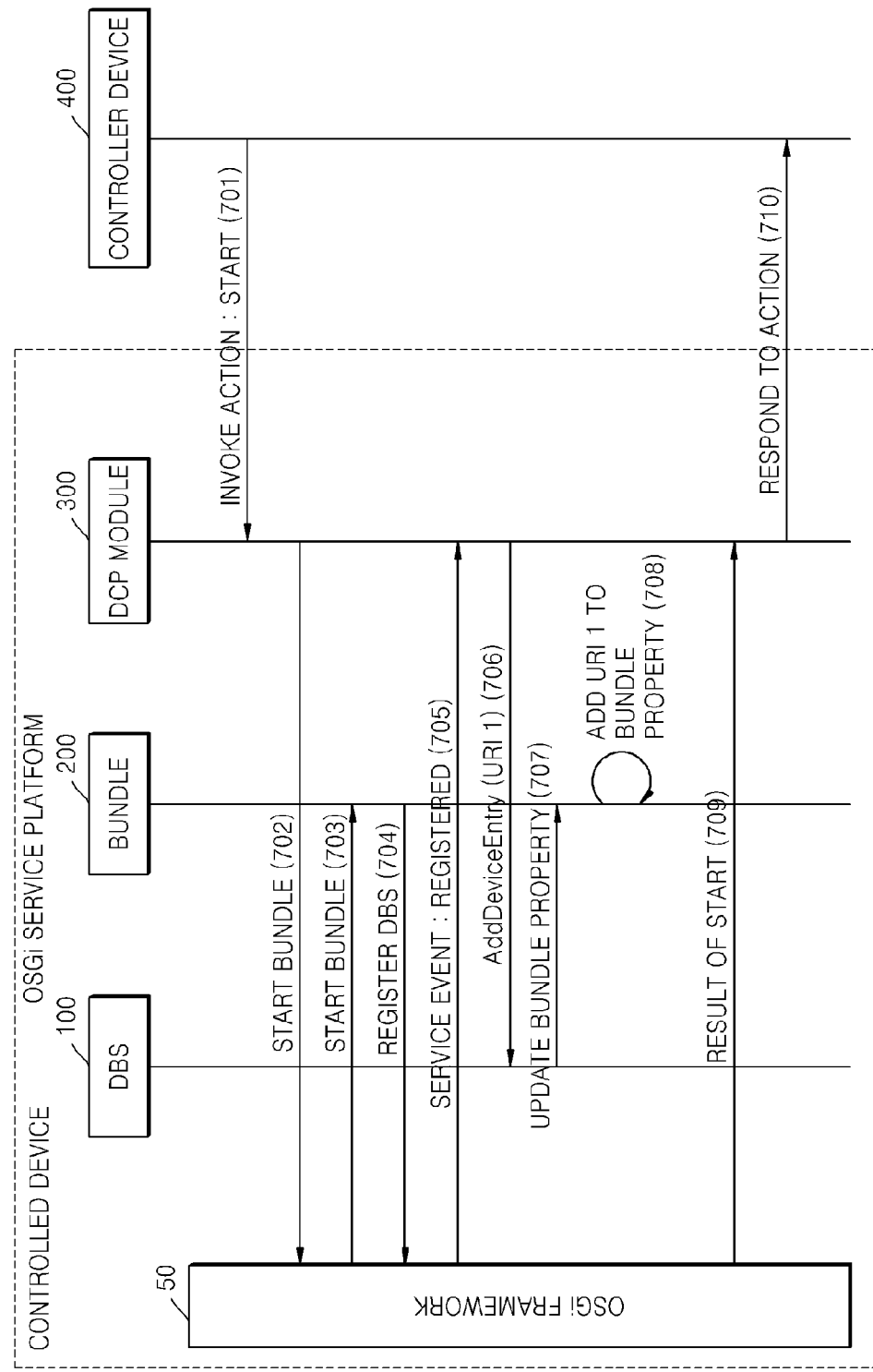

FIG. 7A is a flowchart illustrating an example of an operation of generating binding information.

A controller device 400 invokes an action of a device control protocol (DCP) module 300 and requests a start of a bundle 200 (701).

The DCP module 300 provides a service of the bundle 200 installed into an OSGi framework 50 to the controller device 400 based on a protocol between the controller device 400 and a controlled device, invokes an API of the OSGi framework 50 according to the action invocation of the controller device 400 and returns the result of the invocation to the controller device 400. Thus, the DCP module 300 functions as a gateway between an OSGi service platform of the controlled device and the controller device 400.

The DCP module 300 may be implemented as a bundle or a native application that is outside the OSGi service platform.

The DCP module 300 requests start of the bundle 200 by invoking the API of the OSGi framework 50 (702).

The OSGi framework 50 invokes the API that is used to start the bundle 200, among APIs of the bundle 200 (703).

When the bundle 200 starts, the bundle 200 registers a DBS 100 in an OSGi service registry of the OSGi framework 50 (704).

The OSGi framework 50 notifies a service event, indicating that the DBS 100 has been registered, to the DCP module 300 (705).

The DCP module 300 requests the DBS 100 to generate binding information by using an URI 1, which is an identifier of the controller device 400, by invoking the API of the DBS 100. Here, the API is referred to as AddDeviceEntry( ) (706).

The DBS 100 updates a bundle property (707).

As a result of the updating of the bundle property in 707, the URI 1 is added to the bundle property (708). In other words, binding information that is used to map the bundle 200 and the controller device 400 is generated.

The OSGi framework 50 returns the result of invoking of the API, which is performed in 702, to the DCP module 300 (709).

The DCP module 300 transmits a response message to the action invocation that is performed in 701 to the controller device 400 (710).

FIG. 7B is a flowchart illustrating another example of an operation of generating binding information. In FIG. 7A, one bundle 200 is mapped to a plurality of controller devices, while in FIG. 7B, there exist a plurality of controller devices that are interested in a change of a life cycle of the bundle 200, and thus, a bundle event of the bundle 200 may be notified to the plurality of controller devices.

The controller device 400 requests start of the bundle 200 by invocating an action of the DCP module 300 (750). In this case, a URI 2 is included in an action invocation message. In other words, a different identifier from the URI 1, which is an identifier of the controller device 400, is included in the action invocation message.

Referring to FIGS. 7A and 7B, 751 through 754 are the same as operations 702 through 705 of FIG. 7A, and thus, a description thereof will not be repeated.

The DCP module 300 requests to generate binding information by using the URI 1, which is an identifier of the controller device 400, by invoking an API AddDeviceEntry( ) of the DBS 100 (755).

The DCP module 300 requests to generate binding information by using the URI 2, which is an identifier of another controller device, by invoking the API AddDeviceEntry( ) of the DBS 100 (756).

The DBS 100 updates the bundle property (757).

As a result of the updating in 757, the URI 1 and the URI 2 are added to the bundle property (758). In other words, binding information that is used to map the bundle 200 and two controller devices is generated.

The OSGi framework 50 returns the result of invoking the API, which is performed in 751, to the DCP module 300 (759).

The DCP module 300 transmits a response message to the action invocation that is performed in 750 to the controller device 400 (760).

Figure 8:
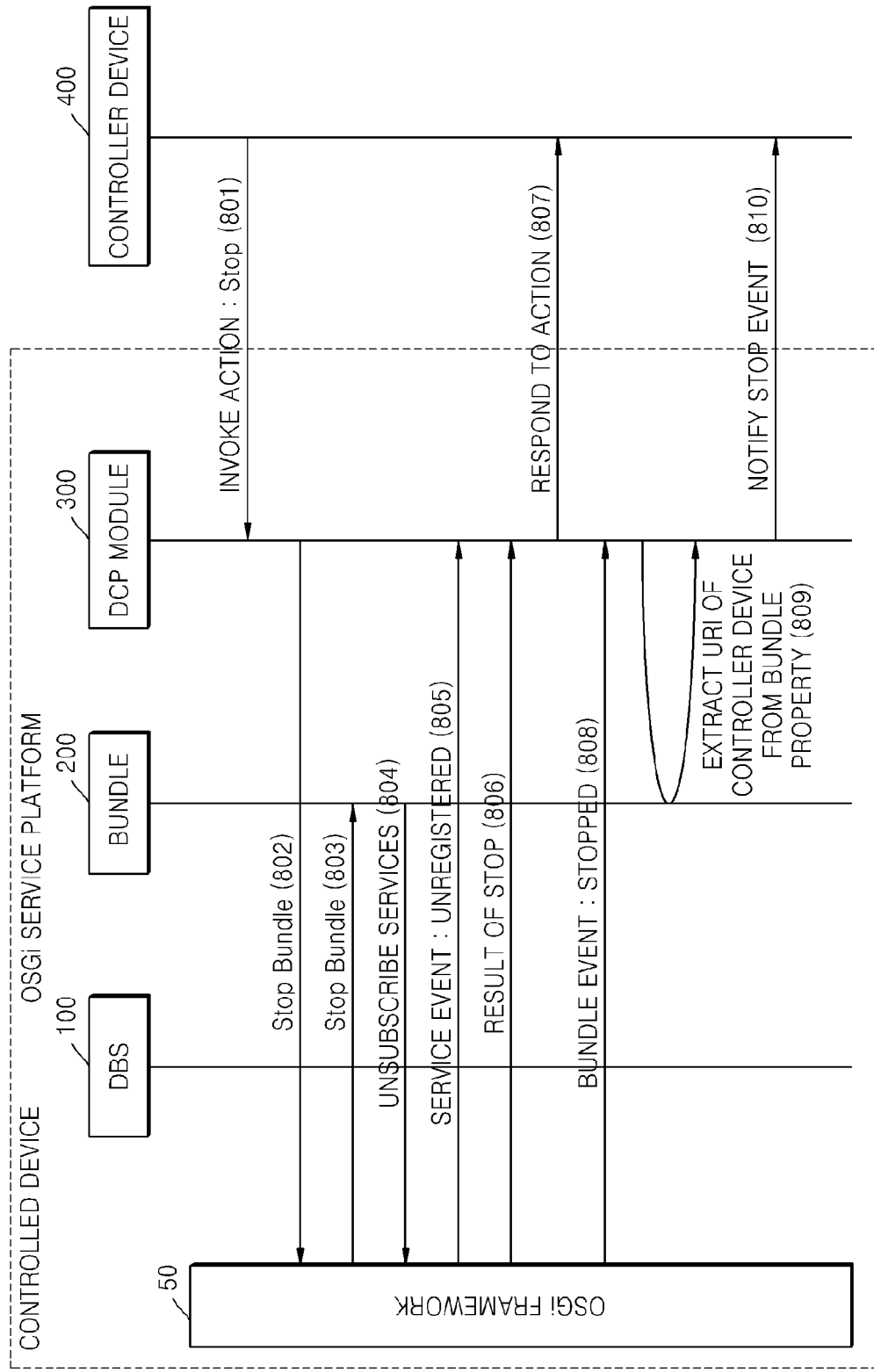
FIG. 8 is a flowchart illustrating an example of an operation of notifying an event when a bundle stops.

FIG. 8 is a flowchart illustrating an example of an operation of notifying an event when a bundle stops.

The controller device 400 invokes an action to stop the bundle 200, among actions provided by the DCP module 300 (801).

The DCP module 300 requests stop of the bundle 200 by invoking the API of the OSGi framework 50 (802).

The OSGi framework 50 invokes the API to stop the bundle 200, among APIs of the bundle 200 (803).

The bundle 200 requests the OSGi framework 50 to unsubscribe services that are registered by the bundle 200 in an OSGi service registry, before the bundle 200 is stopped (804).

The OSGi framework 50 notifies a service event, indicating that the services of the bundle 200 are unsubscribed from the OSGi service registry, to the DCP module 300 (805).

The OSGi framework 50 returns the result of invoking the API, which is performed in operation 802, to the DCP module 300 (806).

The DCP module 300 transmits a response message to the action invocation that is performed in operation 801 to the controller device 400 (807).

The OSGi framework 50 notifies a bundle event, indicating that the bundle 200 has stopped, to the DCP module 300, which is an event listener (808).

The DCP module 300 extracts an URI of the controller device 400 from a bundle property of the stopped bundle 200 (809).

The DCP module 300 notifies the bundle event, indicating that the bundle 200 has stopped, to the controller device 400 by referring to the extracted URI of the controller device 400 (810).

Referring to FIG. 8, the bundle 200 stops due to a request of the controller device 400. However, the bundle 200 may be stopped due to the OSGi framework 50, as when a dependency failure occurs. Nevertheless, operations after 803 through 810 will be performed in the same manner regardless of the manner in which the bundle 200 stops.

Figure 9:
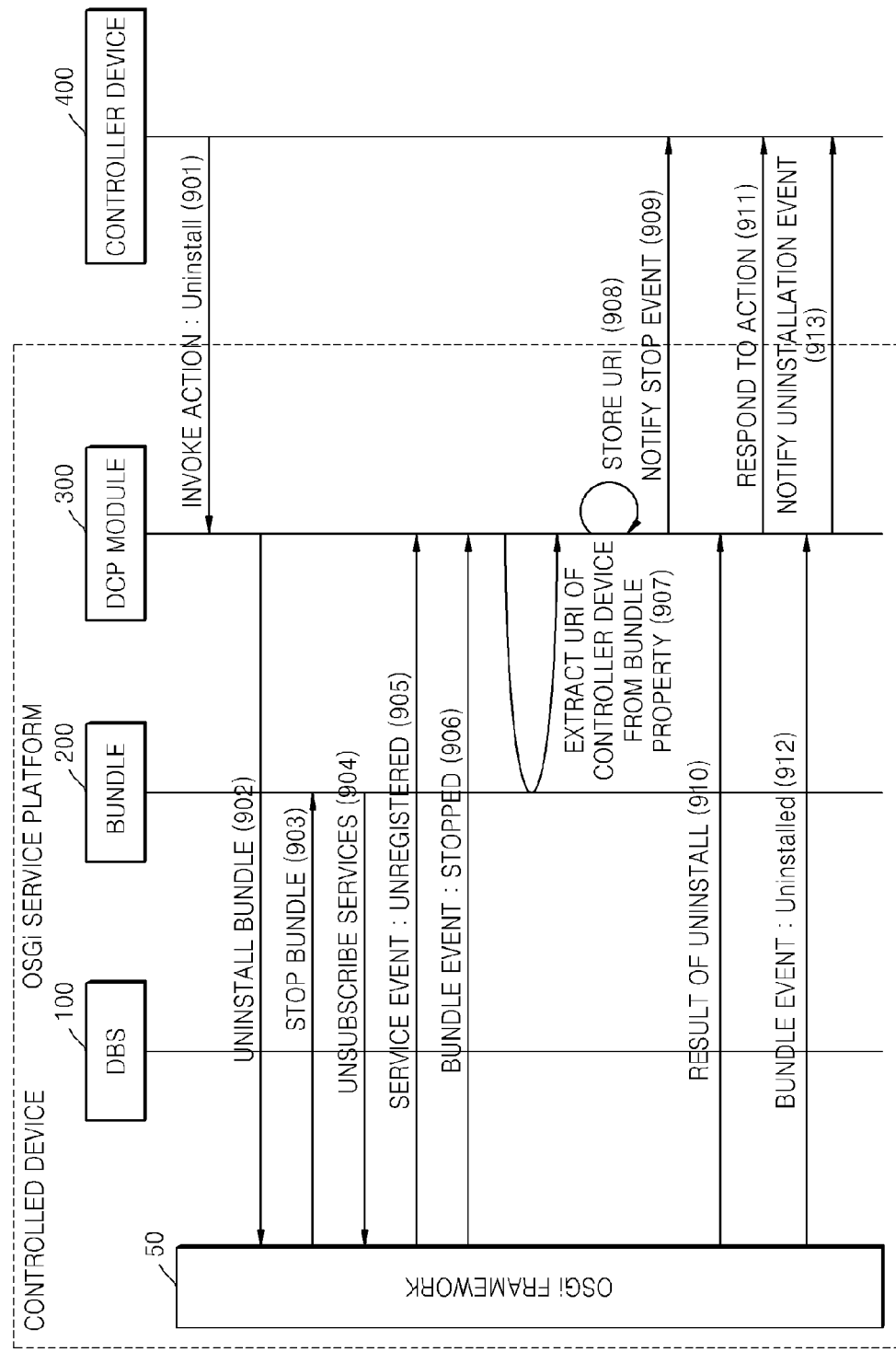
FIG. 9 is a flowchart illustrating an example of an operation of notifying an event when a bundle is uninstalled.

FIG. 9 is a flowchart illustrating an example of an operation of notifying an event when a bundle is uninstalled.

The controller device 400 requests uninstallation of an active bundle 200 by invoking an action of the DCP module 300 (901).

The DCP module 300 requests uninstallation of the bundle 200 by invoking the API of the OSGi framework 50 (902).

The OSGi framework 50 invokes an API to stop the bundle 200 among APIs of the bundle 200 (903).

The bundle 200 requests the OSGi framework 50 to unsubscribe services that are registered by the bundle 200 in the OSGi service registry, before the bundle 200 is stopped (904).

The OSGi framework 50 notifies a service event, indicating that services of the bundle 200 have been unsubscribed from the OSGi service registry, to the DCP module 300 (905).

The OSGi framework 50 notifies a bundle event, indicating that the bundle 200 has stopped, to the DCP module 300 (906).

The DCP module 300 extracts a URI of the controller device 400 from a bundle property (907).

The DCP module 300 stores the URI of the controller device 400 in a region which is not deleted even though the bundle 200 is uninstalled (908).

In order to notify the bundle event, indicating that the bundle 200 has been uninstalled, the URI of the controller device 400 that is interested in the bundle 200 may be referred to. Where binding information is included in the bundle property, in response to the bundle 200 uninstalled, the DCP module 300 may not access the bundle property any more. Thus, the URI of the controller device 400 needs to be backed up in a safe place in advance before the bundle 200 is uninstalled.

The DCP module 300 notifies the bundle event, indicating that the bundle 200 has stopped, to the controller device 400 (909).

The OSGi framework 50 returns the result of invoking the API, which is performed in operation 902, to the DCP module 300 (910).

The DCP module 300 transmits a response message to the action invocation that is performed in operation 901, to the controller device 400 (911).

The OSGi framework 50 notifies the bundle event, indicating that the bundle 200 has been uninstalled, to the DCP module 300, which is an event listener (912).

The DCP module 300 notifies the bundle event, indicating that the bundle 200 has been uninstalled, to the device controller 400 by referring to the URI of the controller device 400 that is backed up in 908 (913).

Figure 10:
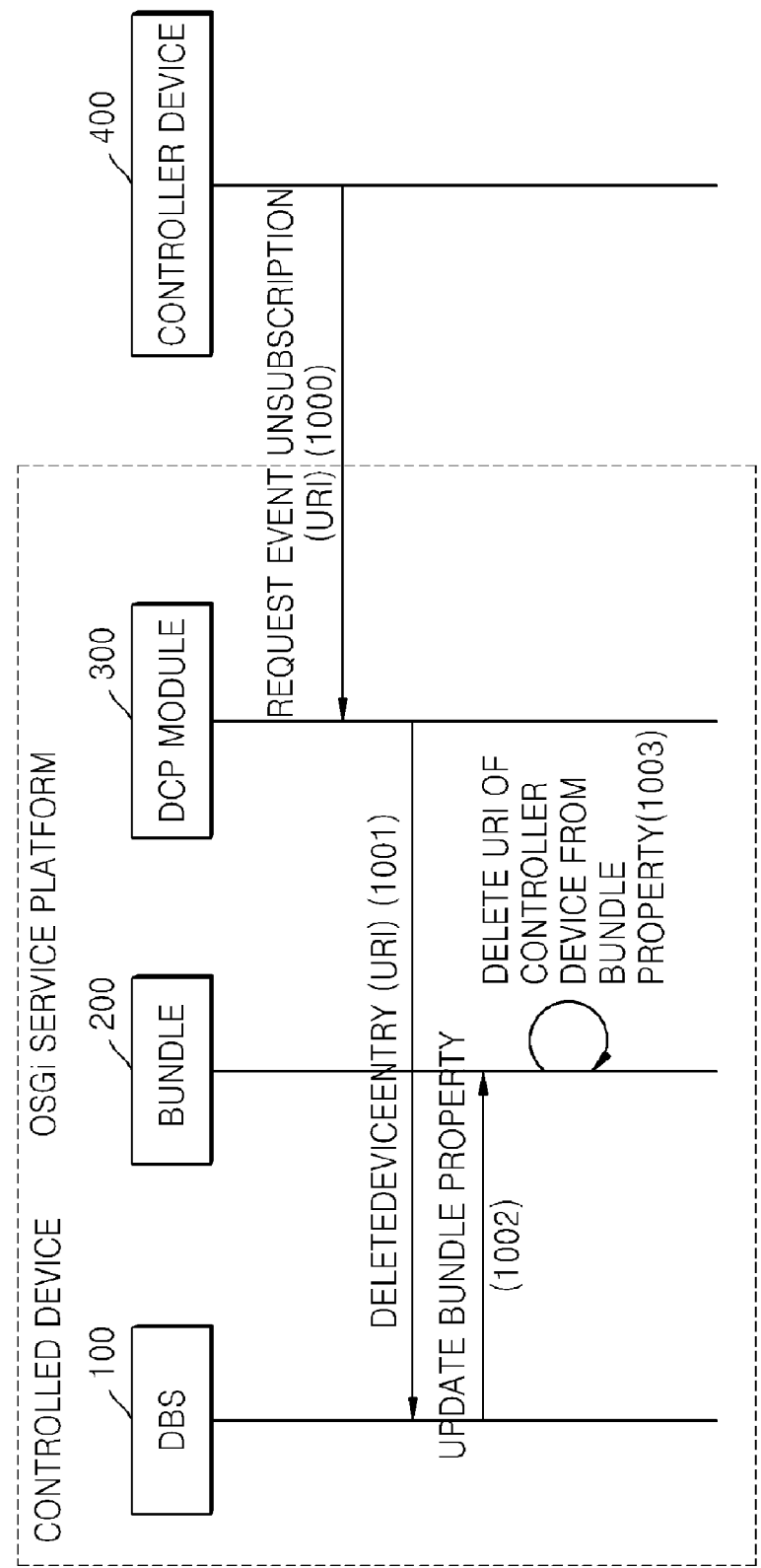
FIG. 10 is a flowchart illustrating an example of an operation of unsubscribing an event.

FIG. 10 is a flowchart illustrating an example of an operation of unsubscribing an event.

The controller device 400 transmits its own URI to the DCP module 300 and requests unsubscription of an event on a change of a life cycle of the bundle 200 (1000).

The DCP module 300 invokes DeleteDeviceEntry( ), which is an API that is used to delete binding information, among a plurality of APIs of the DBS 100 (1001). In this case, the URI of the controller device 400 is transmitted to the DBS 100.

The DBS 100 updates a bundle property of a bundle in which the controller device 400 is no longer interested (1002).

As a result of the above updating, the URI of the controller device 400 is deleted from a bundle property (1103). Thus, the bundle event indicating a change of a life cycle of the bundle 200 will no longer be notified to the controller device 400.

Figure 11:
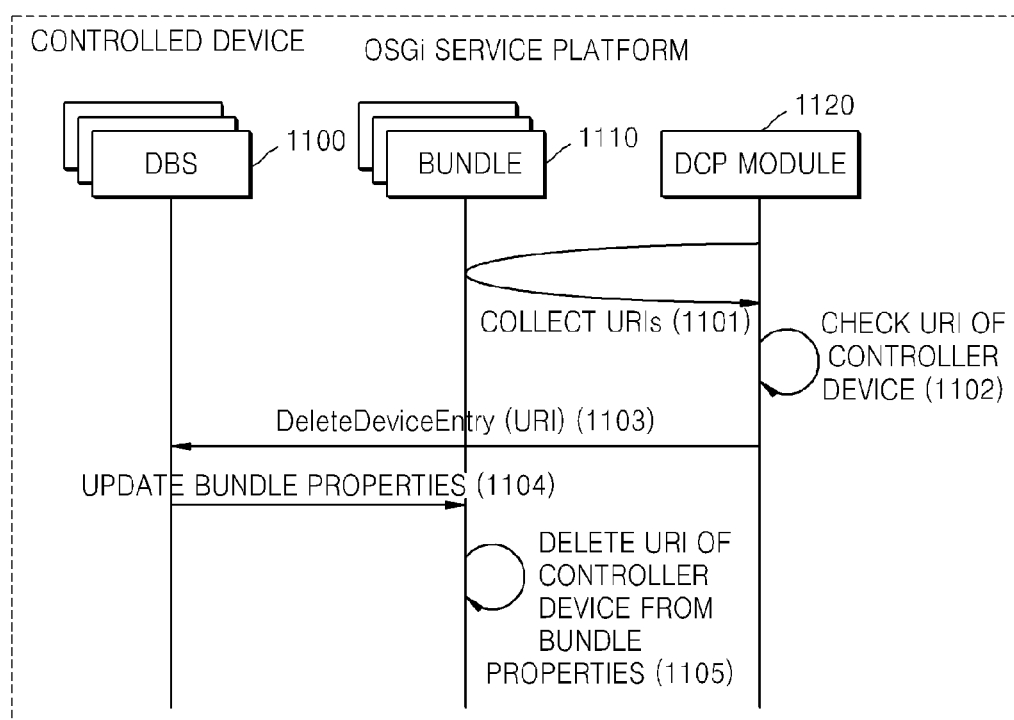
FIG. 11 is a flowchart illustrating an example of an operation of deleting binding information when a controller device is disconnected from a network.

FIG. 11 is a flowchart illustrating an example of an operation of deleting binding information when a controller device is disconnected from a network. The controller device that is interested in a change of a life cycle of the bundle leaves the network without requesting event unsubscription. In other words, while FIG. 10 depicts operations performed when the controller device is normally terminated, FIG. 11 depicts operations performed when the controller device is abnormally terminated.

The DCP module 1120 that detects that the controller device is disconnected from the network collects binding information of all bundles 1110 installed into an OSGi framework (1101). In other words, URIs included in bundle properties of the bundles 1110 are collected.

The DCP module 1120 checks a URI of the controller device that is disconnected from the network, among the collected URIs (1102).

The DCP module 1120 requests DBSs 1100 on each of bundles that include the URI of the controller device disconnected from the network in the bundle property to delete the URI of the controller device (1103). Accordingly, DeleteDeviceEntry( ) of the DBSs 1100 are invoked, and the URI of the controller device is transmitted.

Each of the DBSs 1100 that are requested by the DCP module 1120 updates bundle properties of each bundle (1104).

As a result of updating, the URI of the controller device is deleted from the bundle properties (1105).

The methods described above including a binding information management method may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

According to certain embodiments described above, when a controller device is abnormally terminated, a controlled device deletes binding information related to the controller device automatically so that unnecessary transmission of an event message can be prevented.

Also, a controlled device, in which an OSGi service platform is installed, may identify controller devices to notify changes of life cycles of bundles installed into an OSGi framework, by using binding information.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An open service gateway initiative (OSGi)-based controlled device to manage a bundle that is remotely installed by a controller device, the device comprising:
 a binding information management unit comprising a predetermined service, the predetermined service being configured to generate binding information to map the bundle to the controller device, the binding information being generated in response to an occurrence of a service event, the service event indicating that the predetermined service is registered in an OSGi service registry; and
 an event notification unit configured to:
  notify the controller device of an event related to a change of a life cycle of the bundle; and
  reference the generated binding information when notifying the controller device, wherein the binding information management unit, the event notification unit, or a combination thereof is implemented as hardware or a combination of hardware and software.

2. The device of claim 1, wherein the predetermined service of the binding information management unit is further configured to add an identifier of the controller device to a bundle property of the bundle.

3. The device of claim 1, further comprising:
a device control protocol (DCP) module configured to:
request:
an OSGi framework to start the bundle upon receiving a start action invocation request from the controller device; and
the predetermined service to generate the binding information upon receiving a notification of the service event indicating that the predetermined service is registered; and
respond to the start action invocation request with a result of the request of the OSGi framework to start the bundle upon a reception thereof from the OSGi framework.

4. The device of claim 3, wherein the DCP module is further configured to:
request the OSGi framework to stop the bundle upon receiving a stop action invocation request from the controller device;
respond to the stop action invocation request with a result of the request of the OSGi framework to stop the bundle upon:
a reception thereof from the OSGi framework; and
receiving a notification of the service event indicating that the predetermined service is unregistered; and
notify the controller device of a stoppage of the bundle.

5. The device of claim 2, further comprising:
a binding information backup unit configured to:
receive a request from the controller device for the bundle to be uninstalled; and
store, in response to the received request, the identifier in a region that is not deleted even though the bundle is uninstalled,
wherein the event notification unit is further configured to notify, in response to an occurrence of a bundle event indicating that the bundle has been uninstalled, the controller device of the bundle event by referring to the stored identifier.

6. The device of claim 2, wherein the predetermined service of the binding information management unit is further configured to delete the identifier from the bundle property in response to a request from the controller device to unsubscribe an event subscription.

7. The device of claim 2, further comprising:
a retrieval unit configured to retrieve the bundle including the added identifier among bundles of an OSGi framework of the controlled device in response to a detection that the controller device is disconnected from a network,
wherein the predetermined service of the binding information management unit is further configured to delete the identifier from the bundle property of the retrieved bundle.

8. The device of claim 2, wherein the predetermined service of the binding information management unit is further configured to add, in response to identifiers of other controller devices being included in an action invocation message or an even subscription request message received from the controller device, the identifiers of the other controller devices to the bundle property together with the identifier of the controller device.

9. The device of claim 2, wherein the identifier is a universal resource identifier (URI) of the controller device.

10. A method of managing a bundle that is remotely installed by a controller device, the method being executed by an open service gateway initiative (OSGi)-based controlled device, the method comprising:
generating binding information to map the bundle to the controller device, the binding information being generated in response to an occurrence of a service event, the service event indicating that a predetermined service is registered in an OSGi service registry, the generating of the binding information being performed by the predetermined service; and
notifying the controller device of an event related to a change of a life cycle of the bundle, the generated binding information being referred to in the notifying of the controller device.

11. The method of claim 10, wherein the generating of the binding information comprises adding an identifier of the controller device to a bundle property of the bundle, the adding of the identifier being performed by the predetermined service.

12. The method of claim 11, further comprising:
receiving a request from the controller device for the bundle to be uninstalled; and
storing, in response to the receiving of the request, the identifier in a region that is not deleted even though the bundle is uninstalled,
wherein the notifying of the controller device comprises notifying, in response to an occurrence of a bundle event indicating that the bundle has been uninstalled, the controller device of the bundle event by referring to the stored identifier.

13. The method of claim 11, further comprising deleting, in response to a request from the controller service to unsubscribe an event subscription, the identifier from the bundle property, the deleting of the identifier being performed by the predetermined service.

14. The method of claim 11, further comprising:
retrieving, in response to a detection that the controller device is disconnected from a network, the bundle including the added identifier among bundles of an OSGi framework of the controlled device; and
deleting the identifier from bundle property of the bundle, the deleting of the identifier being performed by the predetermined service.

15. The method of claim 11, wherein the generating of the binding information further comprises adding, in response to identifiers of other controller devices being included in an action invocation message or an event subscription request message received from the controller device, the identifiers of the other controller devices to the bundle property together with the identifier of the controller device, the adding of the identifiers of the other controller devices being performed by the predetermined service.

16. The method of claim 11, wherein the identifier is a universal resource identifier (URI) of the controller device.

17. A computer-readable medium having recorded thereon a program to perform a method of managing a bundle that is remotely installed by a controller device, the method being executed by an open service gateway initiative (OSGi)-based controlled device, the medium comprising instructions to cause a computer to:

generate binding information to map the bundle to the controller device, the binding information being generated in response to an occurrence of a service event, the service event indicating that a predetermined service of the bundle is registered in an OSGi service registry, the generating of the binding information being performed by the predetermined service; and notify the controller device of an event related to a change of a life cycle of the bundle, the generated binding information being referred to in the notifying of the controller device.

* * * * *